Aug. 24, 1954

H. J. HOGE 2,687,510

ELECTRICAL MEASURING SYSTEM

Filed Aug. 14, 1952

*INVENTOR.*
HAROLD J. HOGE

BY

Woodcock and Phelan

ATTORNEYS

Aug. 24, 1954   H. J. HOGE   2,687,510
ELECTRICAL MEASURING SYSTEM
Filed Aug. 14, 1952   5 Sheets-Sheet 2

INVENTOR.
HAROLD J. HOGE
BY
Woodcock and Phelan
ATTORNEYS

Aug. 24, 1954
H. J. HOGE
2,687,510
ELECTRICAL MEASURING SYSTEM
Filed Aug. 14, 1952
5 Sheets-Sheet 3
*Fig.9*
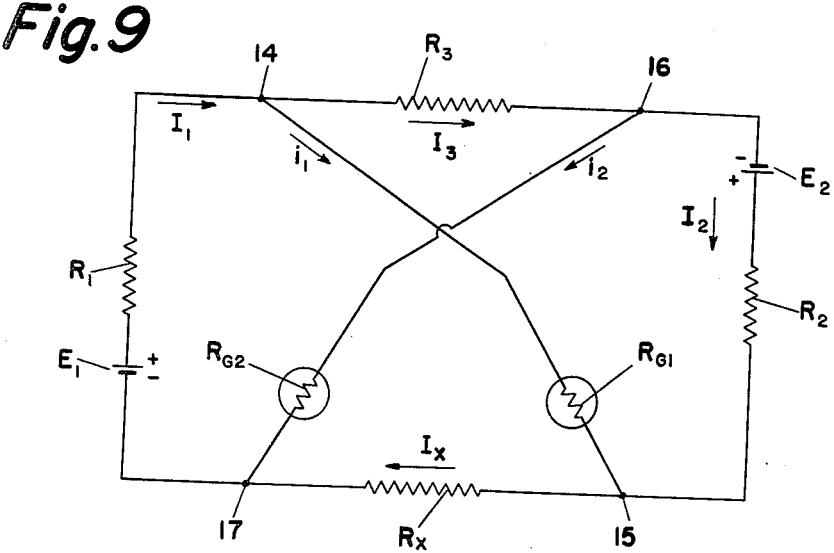
*Fig.10*
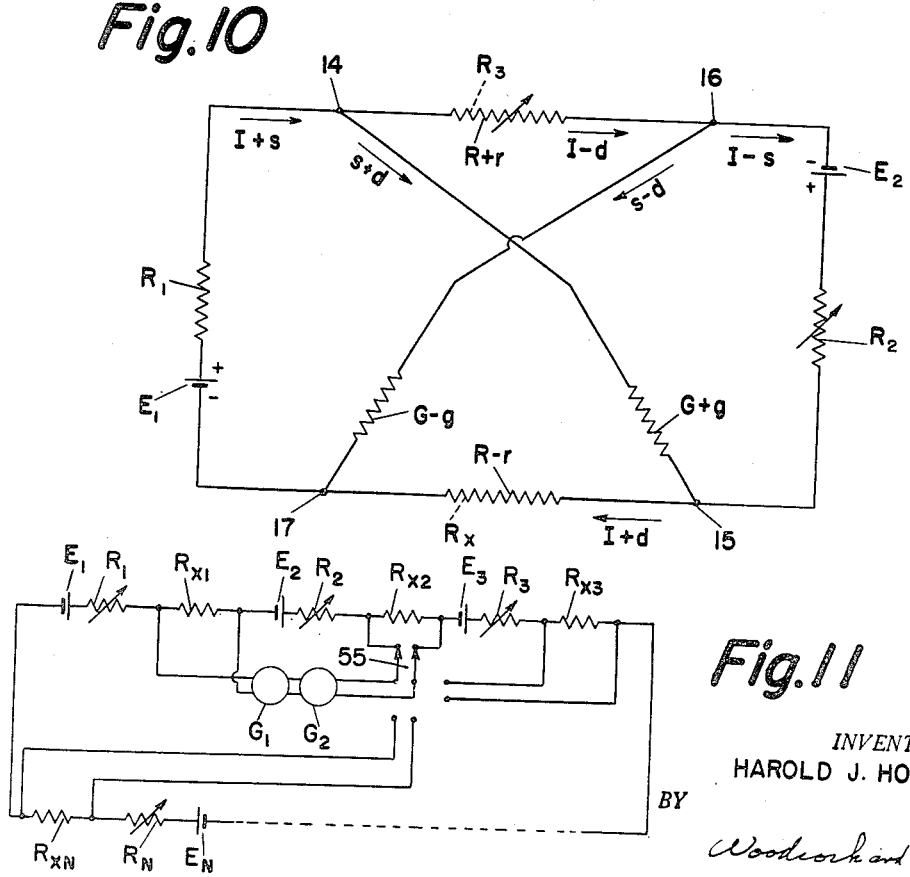
*Fig.11*
INVENTOR.
HAROLD J. HOGE
BY
Woodcock and Phelan
ATTORNEYS Patented Aug. 24, 1954

2,687,510

UNITED STATES PATENT OFFICE 2,687,510

ELECTRICAL MEASURING SYSTEM

Harold J. Hoge, Lafayette Hill, Pa., assignor to Leeds and Northrup Company, Philadelphia, Pa., a corporation of Pennsylvania Application August 14, 1952, Serial No. 304,365

14 Claims. (Cl. 324—57)

This invention relates to electrical measuring systems and has for an object the provision of a system which while of use generally, is particularly adapted for the measurement of the resistance of resistors unaffected by variation in the resistance of the leads extending therefrom.

As well understood by those skilled in the art, if there is to be accurate measurement of resistance by the Wheatstone bridge method, two successive balances will be required in order to eliminate the effect of lead resistance. The successive balances are also required if the potentiometer method or a Kelvin bridge be utilized.

It is a further object of the present invention to provide a method of, and a means for, measuring the resistance of resistors with two balances simultaneously made and which makes the measurement independent of lead resistance.

It is a further object of the invention to provide measurement of resistance unaffected by length or material of the leads and without need of changing any of the connections in that part of the circuit consisting of a first resistor whose magnitude is to be measured, a second resistor with which the first is to be compared, and the detecting means connected to them.

In carrying out the invention in one form thereof, the resistor which is to be measured is connected in series-circuit relation with a reference resistor and with two voltage sources. A detecting means including at least one sensitive element has two circuit branches. One extends between an end of the reference resistor and the end of corresponding polarity of the resistor to be measured while the other branch extends to the remaining ends of said resistors. By adjusting the potential distribution of the series-circuit to develop potentials at the respective ends of one of said resistors which have an average value equal to the average value of the potentials developed at the respective ends of the other resistor (secondary balance) and by adjusting the reference resistor until the potential difference between the respective ends thereof is equal to the potential difference between the respective ends of the resistor to be measured (primary balance), determination of its resistance value may be made quite independent of the resistance of the leads.

The resistor whose resistance is to be determined will be referred to as the unknown resistor os as the second resistor. It may be of the four-lead type, and either of relatively high resistance as in the case of resistance thermometers or of relatively low resistance as in the case of ammeter shunts. The potential distribution of the series-circuit may be adjusted simultaneously with the adjustment of the reference resistor or the adjustments may be made in succession. In nearly every case it will be satisfactory at relatively infrequent intervals to adjust the circuit for the attainment of secondary balance. The adjustment of the reference resistor may be continuous when it is desired closely to follow variations in the resistance value of the unknown resistor, or the adjustment of the reference resistor for primary balance may be intermittent where it is desired at selected intervals to determine the resistance value of the unknown resistor.

Further in accordance with the invention, measurement of resistance can be accomplished with relatively high accuracy by achieving the primary balance and even with considerable secondary unbalance.

For further objects and advantages of the invention reference is to be had to the following detailed description taken in conjunction with the accompanying drawings, in which:

Fig. 1 diagrammatically illustrates a preferred modification of the invention;

Fig. 2 illustrates a second modification;

Fig. 3 makes clear the difference between the present system and a Wheatstone bridge;

Fig. 4 diagrammatically illustrates a four-lead resistor;

Figs. 9 and 10 are simplified variations of the modification of Figs. 1–3, 5 and 12 to be referred to in developing the underlying mathematical theory;

Fig. 11 illustrates a modification involving a multiplicity of impedances;

Figure 1:
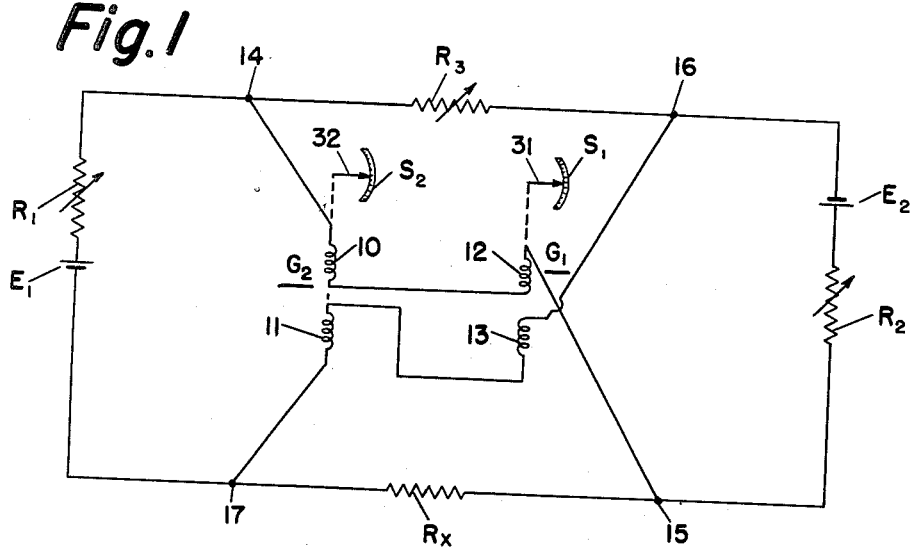

Referring to Fig. 1, the invention has been shown applied to the measurement of impedance such as the resistance of an unknown resistor $R_x$ and including a series-circuit having in series-circuit relation with $R_x$ a voltage source $E_1$, impedances or resistors $R_1$ and $R_3$, a voltage source $E_2$, and an impedance or resistor $R_2$. It will be observed the polarity of voltages $E_1$ and $E_2$ are aiding in the series-circuit, and hence, current will flow in a clockwise direction around the series-circuit as viewed in Fig. 1. The detecting means comprises one sensitive element $G_2$ having a pair of coils 10 and 11 and a second sensitive element $G_1$ having coils 12 and 13. It will be observed that the coil 10 of the sensitive element $G_2$ is connected in a circuit branch which extends from a point 14 which is more positive than the point 16, the circuit including coils 10 and 12 and ending at point 15 which is more positive than point 17. Stated differently, the coils 10 and 12 are connected to the series-circuit between points 14 and 15 of the same relative polarity while coils 11 and 13 are connected between points 16 and 17 of the same relative polarity.

It will be observed that with a difference in potential between points 14 and 15 and with the same difference in potential between the points 16 and 17, current will flow through coils 10 and 11 in the same direction and will flow in opposite directions through coils 12 and 13. With coils 10 and 11 identical with each other (and with coils 12 and 13 identical with each other) there will be deflection of the pointer 32 of sensitive element $G_2$ while the pointer 31 of sensitive element $G_1$ will remain at standstill since the torques produced by coils 12 and 13 will balance each other. The deflection of sensitive element $G_2$ will be reduced as the potentials of point 14 and of point 16 are made to approach respectively the potentials of points 15 and 17. If the potentials of points 14 and 16 be initially higher than the potentials of points 15 and 17, the deflection of element $G_2$ will be reduced by increasing $R_1$ (or alternatively, by reducing the value of $R_2$). Thus, by adjusting the potential distribution of the series-circuit until the potentials at the respective ends of $R_3$ have an average value equal to the average value of the potentials developed at the respective ends of resistor $R_x$, the circuit will be in secondary balance. Sensitive element $G_2$ will be at zero and will not deflect.

It will now be assumed that the potential of point 14 is higher than that of point 15, as before, but that the potential at point 17 is now higher than the potential of point 16, the drop from 14 to 15 being numerically equal to the drop from 17 to 16. With the foregoing assumptions, it will be seen that current will flow in opposite directions through coils 10 and 11 of sensitive element $G_2$ and current will flow in the same direction through coils 12 and 13 of sensitive element $G_1$. Accordingly, the pointer 32 of sensitive element $G_2$ will not deflect but the pointer 31 of sensitive element $G_1$ will deflect.

It may be further observed that the current which flows through the several coils may be traced from point 14 through coils 10 and 12, point 15, resistor $R_x$, to point 17, coils 11 and 13, and to point 16. If now the resistance of resistor $R_3$ be reduced, the potential difference between points 14 and 16 will likewise be reduced and thus the potential of point 14 will be brought nearer to the potential of point 15 and similarly, the potential of point 16 will be raised and will approach more nearly the potential of point 17. At balance (primary balance achieved) and with the sensitive element $G_1$ at zero, the potential difference between points 14 and 16 will be exactly equal to the potential difference between points 15 and 17.

The two conditions of unbalance which have been described may occur simultaneously and $R_1$ and $R_3$ may be adjusted simultaneously to produce balance of the measuring circuit. When the circuit is in balance for both $G_1$ and $G_2$, $R_3$ will be precisely equal to $R_x$. Thus, if $R_3$ is a calibrated adjustable resistor the value of $R_x$ will be readily determined.

In summary, it has been demonstrated that the sensitive element $G_1$ responds to a difference in potential between the respective ends of resistor $R_3$ (points 14 and 16) which is different than the potential difference between the ends of unknown resistor $R_x$ (points 15 and 17). If $R_3$ is equal to $R_x$, $G_1$ will not deflect. With $R_3$ equal to $R_x$, a change in $R_1$ or in $R_2$ will not cause $G_1$ to deflect for the reason that a change in potential produced by change in current through the series-circuit does not change the relative potential drops across $R_3$ and $R_x$ and any current flowing due to secondary unbalance will be cancelled out by its flow in opposite directions through coils 12 and 13 of sensitive element $G_1$. The sensitive element $G_1$ responds to primary unbalance of the system, and as has been demonstrated, does not respond to secondary unbalance of the system. Conversely, the sensitive element $G_2$ which is sensitive to the average of the potentials at points 14 and 16 as compared with the average of the potentials of points 15 and 17, will not respond to primary unbalance. It will be seen that a change in the value of $R_3$ or $R_x$ will not change the average potentials of points 14 and 16 (or of points 15 and 17) and hence, the sensitive element $G_2$ will respond to secondary unbalance but not to primary unbalance. The mathematical basis for the conclusions here set forth will be later presented. These conclusions have been verified in practical operation of the system. The coils 10 and 11 and the coils 12 and 13 need not be precisely matched as regards the production of torque on their respective sensitive elements.

Since adjustment of $R_1$ or of $R_2$ changes the potential distribution, $E_1$ and $R_1$ and $E_2$ and $R_2$ in the claims have been generically referred to as variable or adjustable voltage sources. Any conventional adjustable sources of potential difference may be utilized.

While the sensitive elements $G_1$ and $G_2$ have been illustrated in the form of galvanometers associated with suitable scales and each provided with a pair of coils, it is to be understood that other sensitive elements can be utilized as the detecting means, several different forms of which will be later described in detail.

Figure 2:
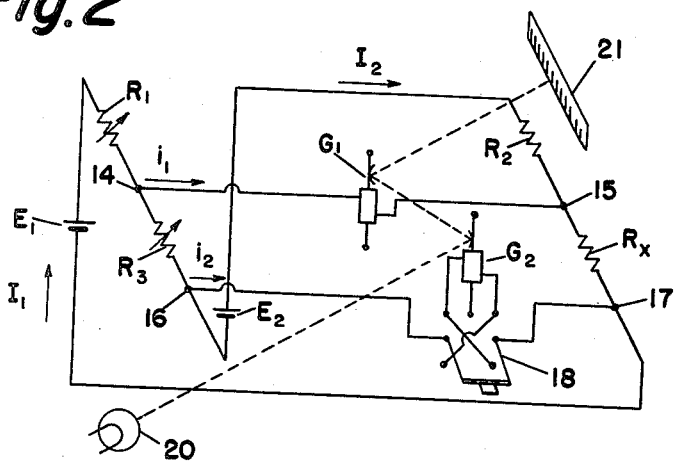

Reference to Fig. 2 will be of assistance in understanding the theory involved in the circuit of Fig. 1 though Fig. 2 also illustrates a modification of the invention. In Fig. 2 the circuit elements are identical except that the detecting means comprises single coil galvanometers $G_1$ and $G_2$ in lieu of the double-coil sensitive elements of Fig. 1.

In Fig. 2 it will be observed that the potential of the voltage source $E_1$ is a maximum in the positive sense at the upper end of resistor $R_1$ and decreases to a minimum at the lower end of resistor $R_3$. The inclusion of the voltage source $E_2$ in series in the circuit raises the potential to a new high value which decreases from a maximum at the upper end of $R_2$ to a minimum at the lower end of $R_x$. If the ratio of $E_1$ to $R_1+R_3$ equals the ratio of $E_2$ to $R_2+R_x$ and if $R_3$ equals $R_x$, the circuit will be in balance and there will be no deflection of either sensitive element $G_1$ or sensitive element $G_2$. Mathematically $$R_3 = R_x \tag{1}$$

$$\frac{E_1}{R_1+R_3} = \frac{E_2}{R_2+R_x} \tag{2}$$

Equations 1 and 2 respectively set forth the conditions for primary and secondary balance of the network.

It will be observed that a reversing switch 18 is provided in order to reverse the current flow through the coil of the sensitive element of the galvanometer $G_2$ and this sensitive element will not deflect when the circuit is in balance regardless of the position of the reversing switch 18.

If it be assumed that Equation 2 holds and that $R_3$ is not equal to $R_x$, it will, of course, be understood that $R_3$ is adjusted until it is equal to $R_x$. In Fig. 2 the needed adjustment of $R_3$ is determined by the detecting system which includes a light source 20 which directs a beam of light upon the mirror of sensitive element $G_2$ from which it is reflected to the mirror of sensitive element $G_1$ and thence to a scale 21. With the reversing switch in one position, for example the lower position as illustrated, the detecting system will be sensitive to adjustments of $R_3$ but insensitive to adjustments of $R_1$. Accordingly, $R_3$ will be adjusted until the spot of light upon scale 21 is moved to its zero position.

If $R_3$ equals $R_x$ and Equation 2 is not satisfied, then of course, the reversing switch 18 is moved to its other position (to its upper position) and resistor $R_1$ adjusted until the light beam on scale 21 is again returned to zero.

Again, two conditions of unbalance have been described and which in practice may occur simultaneously. In practice it is preferred that the reversing switch 18 be placed in one position and $R_3$ adjusted to move the light beam toward zero. If the movement is slow, the reversing switch 18 will be moved to its other position and the adjustment of $R_3$ completed with the reversing switch in the position that results in the more rapid motion of the light beam. When the light beam has been brought to a minimum value, reversing switch 18 is moved to its opposite position and $R_1$ adjusted. With one or two adjustments of the kind indicated the system is brought into balance, both primary and secondary, for accurate determination of the value of $R_x$.

Figure 3:
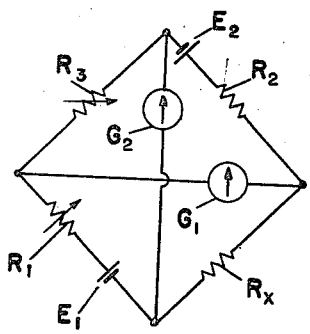

While the systems disclosed in Figs. 1 and 2 differ from other measuring systems, there are certain similarities with respect to a Wheatstone bridge. The essential difference, however, between the present measuring system and the Wheatstone bridge will be readily apparent from an inspection of Fig. 3 which is electrically identical with Fig. 2 (the reversing switch in Fig. 3 being omitted). It will be seen that one sensitive element $G_1$ is connected across one diagonal while the other sensitive element $G_2$ is connected across the other diagonal. The voltage sources $E_1$ and $E_2$ are included in what appear to be opposite arms. $R_x$ and $R_3$ also are connected in what appear to be the remaining opposite arms. However, a common current flows through the series-circuit including all of the so-called "arms" and without division as between the various branches, which division characterizes the Wheatstone bridge. At balance of the system of Fig. 3 there is zero potential difference across both of the diagonals. While Fig. 3 has been drawn with the general configuration of the Wheatstone bridge, it will be readily seen that about the only thing it has in common with the bridge is that it comprises a six-branch network, the applicable equations being quite different, as will later appear.

The present invention is particularly applicable to the measurement of the resistance of what those skilled in the art generally refer to as "four-terminal resistors." Such resistors are described in detail at pages 220 et seq. of "Electrical Measurements" by Harris (1952). At pages 290 et seq. there are described conventional methods of measuring resistance of four-terminal resistors shown as resistance thermometers. With a Wheatstone bridge the resistance thermometer may be connected in one arm together with the leads extending thereto if at the same time there be connected in the adjacent arm compensating leads which are identical in resistance and resistance characteristics with the leads from the resistance thermometer. There is also described the manner in which the Mueller's modification of the Wheatstone bridge may be utilized for the measurement of resistance of the thermometer independently of the resistance of the four leads extending thereto. The method involves two balances with the leads interchanged as between adjacent arms. Thus, special switching is required in the branches of the measuring circuit which include the unknown resistor. With such a system there is lacking the assurance that the resistance of the thermometer does not change between the time the first balance is attained and the time the second balance is attained.

Figure 4:
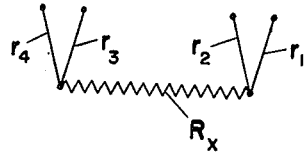
Figure 5:
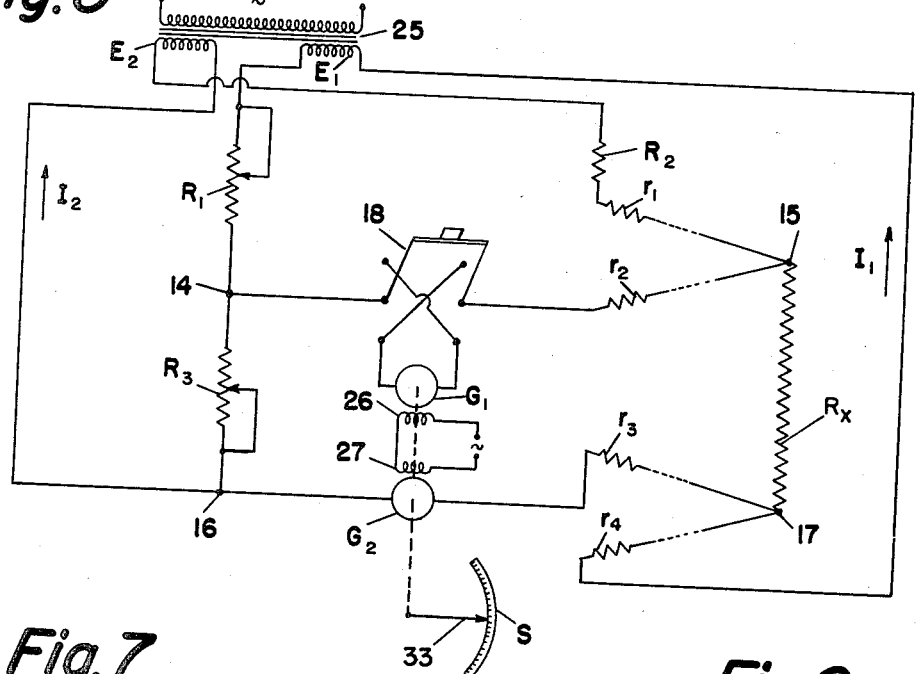
Fig. 5 illustrates the measuring system with the four-lead resistors of Fig. 4 included therein and with certain other features which may be utilized with other modifications of the invention.

Such a four-terminal resistor, whether it be an instrument shunt of very low resistance or a resistance thermometer of much higher resistance, has been diagrammatically illustrated in Fig. 4 as resistance $R_x$. The leads extending thereto have been designated as $r_1$, $r_2$, $r_3$ and $r_4$. The connection of such a resistor into any of the measuring networks disclosed in the drawings will be the same as illustrated diagrammatically in Fig. 5. Fig. 5 also includes additional features which may be utilized with other modifications of the invention, such for example as the provision of an alternating current supply transformer 25 having a secondary winding forming the voltage source $E_1$ and another secondary winding forming the voltage source $E_2$. With the voltage sources $E_1$ and $E_2$ alternating current, the detecting means shown as galvanometers $G_1$ and $G_2$ will be provided with field coils 26 and 27 supplied from the same source of alternating current as the supply transformer 25. The two galvanometers $G_1$ and $G_2$ are mechanically connected together jointly to move a pointer 33 relative to the scale S.

From the explanation set forth above it will be recalled that $R_1$ and $R_3$ are adjusted until the pointer 33 of the detecting means remains at its zero position and with the reversing switch 18 in either of its two positions. Thus, with the circuit balanced there will be zero potential difference between the points 14 and 15 and there will likewise be zero potential difference between the points 16 and 17. Accordingly, there will be zero current flow in the branch including galvanometer $G_1$ and the resistance $r_2$ of one of the leads and similarly, there will be zero current flow through the branch including galvanometer $G_2$ and the resistance $r_3$ of another of the leads. Accordingly, the resistance of the leads $r_2$ and $r_3$ does not affect the balance of the system since there is zero current flowing through them. The inclusion of the leads and their resistances $r_1$ and $r_4$ in the series-circuit results only in compensating change in the setting of resistor $R_1$ in order to achieve secondary balance. That balance is established regardless of what may be the resistance of leads $r_1$ and $r_4$. With the secondary balance established, an exact measurement of the value of the resistance thermometer or other four-lead resistor represented by $R_x$ is achieved by the adjustment of the calibrated resistor $R_3$.

Inasmuch as it has been shown that the invention is applicable both to direct current and alternating current networks, those skilled in the art will understand that in Fig. 5 $R_1$—$R_3$ and $R_x$ may comprise impedances with provision in the network to bring it into balance both with respect to phase and magnitude of the potentials at points 14—17.

In the explanation presented thus far it has been tacitly assumed that with the network finally balanced, $R_3$ equals $R_x$ and this assumption has been valuable to simplify the explanation. However, for two-terminal resistors balance may be achieved when $R_3$ is equal to any predetermined multiple of $R_x$. For example, Fig. 6, the foregoing may be achieved by utilizing a shunt preferably of the Ayrton type represented by the resistor 30 shunting the sensitive element $G_2$ of the detector means. Any selected connection to resistor 30 from the two voltage sources $E_1$ and $E_2$ may be made by any suitable means such as by adjustable contact 30a.

Figure 6:
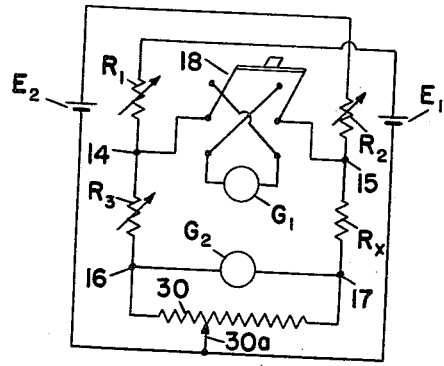
Fig. 6 illustrates a modification including a current-shunt.

It will be seen from an inspection of the circuit of Fig. 6 that if $R_x$ is larger than $R_3$ with the network in balance, more current must flow through $R_3$ to establish equal potential differences between points 14 and 16, and between points 15, 17. More current will flow in the branch including resistor $R_3$ with the contact 30a to the left of center, as illustrated. For conditions where $R_x$ is smaller than $R_3$, contact 30a would be moved to the right of center, nearer the point 17. Accordingly, with the contact 30a connected to the resistor 30, which preferably would be a tap-connection thereto for establishment of a known ratio of resistance to the left and to the right thereof, the variable voltage source is adjusted as by resistor $R_1$ or $R_2$ until the current through the reference resistor $R_3$ bears a predetermined relation with respect to the current through resistor $R_x$. With the requirements of the secondary balance met, the reference resistor $R_3$ is adjusted until its resistance bears the same relation to that of resistor $R_x$ as the current through resistor $R_x$ bears to the current through resistor $R_3$. The resistance value of $R_x$ is then determined by the resistance value of the calibrated resistor $R_3$ with the system in balance multiplied by the factor established by the position of contact 30a with respect to resistor 30.

Figure 7:
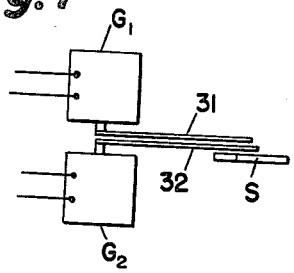
Figs. 7 and 8 are fractional views illustrating an alternative arrangement of the detecting means.
Figure 8:
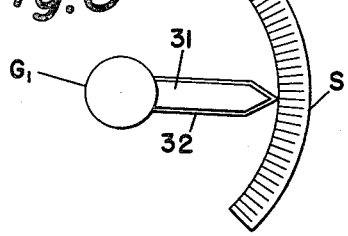

There has been illustrated in Fig. 1 detector means including the two sensitive elements $G_1$ and $G_2$, each continuously operable and with each of pointers 31 and 32 continuously effective in association with scales $S_1$ and $S_2$. In Fig. 2 the deflections of two sensitive elements $G_1$ and $G_2$ have been optically combined. In Fig. 5 the torques of the sensitive elements have been mechanically combined. Other arrangements may be utilized. The one illustrated in Figs. 7 and 8 is particularly applicable to the system of Fig. 6. However, in this connection it is to be noted that two sensitive elements, such as the two galvanometers $G_1$ and $G_2$ of Fig. 7, may be utilized in any of the system in lieu of the detecting means illustrated and described in connection therewith.

In Fig 6 the sensitive element, which may be the galvanometer $G_1$ as shown in Fig. 7, may have its pointer 31 extending outwardly above a scale S. The other sensitive element, such as galvanometer $G_2$, has its pointer 32 arranged to extend in the same direction as pointer 31. With the system in balance, the arrangement is such that pointer 31 extends over and above pointer 32, as illustrated in Fig. 8. The scale S is preferably included though not essential for the following reasons:

If in Fig. 6, $R_3$ be adjusted in the wrong direction, i. e., to depart from the value it should have to bring the system into balance, the angularity between pointers 31 and 32 will increase. Hence, the adjustment of resistor $R_3$ will be reversed to decrease the angularity between the pointers 31 and 32 to a minimum. When at minimum, resistor $R_1$, or alternatively resistor $R_2$, will be adjusted with the reversing switch 18 in its other position further to decrease the angularity. When again at minimum, the reversing switch will be moved to its first position, $R_3$ again adjusted reducing angularity between pointers 31 and 32, followed by further adjustment of $R_1$ or $R_2$. With one or two operations, the system will be brought into exact balance. With primary and secondary balance achieved, there will be zero deflection of the galvanometers since there will be zero current through them. The resistance value of $R_3$ will then be a known multiple, though it may be fractional, of resistor $R_x$.

Reference will now be made to Fig. 9 which is a simplified representation of the modifications of Figs. 1–3, 5, and 12. As is well understood, the current flow in the several branches of the network may be assumed. With the conventional approach, the current flow from battery $E_1$ through resistor $R_1$ will be represented by $I_1$ and the current through the branch including sensitive element $G_1$ by $i_1$; the current in the branch including galvanometer $G_2$ by $i_2$; and the current in the branch including source $E_2$ and resistor $R_2$ by $I_2$. It will be found that the applicable equations in terms of the foregoing are exceedingly complex and of little value in an analysis explanatory of the operation of the system. This complexity results because the symbols chosen for the currents and resistances in Fig. 9 do not exhibit the basic symmetry that exists between the various circuit elements.

In the description of operation thus far the resistance of the sensitive elements has been neglected but in Fig. 9 the resistances of the respective branches 14—15 and 16—17 including that of each coil therein have been indicated by dotted lines as $R_{G1}$ and $R_{G2}$. Such resistances, of course, must be taken into account in writing the equations applicable to the network. The symbol $R_{G1}$ always represents the resistance of the detecting branch connecting points 14 and 15. In Fig. 1 this branch includes two coils; in Figs. 2, 3, 5 and 12 it includes only one coil. Likewise, the symbol $R_{G2}$ always represents the resistance of the detecting branch connecting points 16 and 17, regardless of whether this branch includes one coil or more than one.

I have found that the mathematical analysis may be greatly simplified by the choice of currents and symbols illustrated in Fig. 10. Since the objective is to bring the value of $R_3$ equal to the value of $R_x$, it is convenient to express each of these in terms of their average value and in terms of the deviation of each from this average value. The average value will be designated by $R$ and the magnitude of the deviation of either $R_3$ or $R_x$ from their average will be designated by $r$. Mathematically $$R = \frac{R_3 + R_x}{2}$$

and $$r = \frac{R_3 - R_x}{2}$$

whence $R_3 = R + r$ and $R_x = R - r$. This choice of symbols does not limit the values that may be assumed by $R_3$ and $R_x$. It is convenient because, at balance, $r = 0$ and $R_3 = R_x = R$; and because, in the neighborhood of balance, $r$ is a small quantity, which may, of course, be either positive or negative.

The same reasoning can also be applied to the designation of currents. Before doing so, however, it is preferable to make use of Kirchhoff's first law, and in this way to reduce the number of current symbols required from six to three. Application of this law to any three of the circuit junction points 14, 16, 15, 17 of Fig. 9 yields the following equations, which may be verified by application of the law to the fourth junction point:

$$I_3 = I_1 - i_1 \quad (3)$$
$$I_2 = I_1 - i_1 - i_2 \quad (4)$$
$$I_x = I_1 - i_2 \quad (5)$$

Continuing with the introduction of those symbols which best exhibit the basic symmetry of the circuit, $s$ is defined as the average value of the downward current in the two detecting branches of the circuit, that is, $$s = \frac{i_1 + i_2}{2}$$

and $d$ is defined as $$\frac{i_1 - i_2}{2}$$

Accordingly, $i_1 = s + d$, and $i_2 = s - d$; and $d$ is the magnitude of the deviations of currents $i_1$ and $i_2$ from their average value $s$. If the currents $i_1$ and $i_2$ be now expressed mathematically in terms of the currents $s$ and $d$, Equations 3, 4 and 5 take the following form:

$$I_3 = I_1 - s - d \quad (6)$$
$$I_2 = I_1 - 2s \quad (7)$$
$$I_x = I_1 - s + d \quad (8)$$

As a final step in the introduction of the symbols which best exhibit the symmetry of the circuit, the current $I$ is defined as the average of the current $I_1$, which flows in the branch of the circuit containing the resistor $R_1$ and the voltage source $E_1$; and the current $I_2$, which flows in the branch containing the resistor $R_2$ and the voltage source $E_2$. Mathematically $$I = \frac{I_1 + I_2}{2}$$

This equation, used in conjunction with Equations 6, 7 and 8, leads to the following mathematical relations:

$$I_1 = I + s \quad (9)$$
$$I_2 = I - s \quad (10)$$
$$I_3 = I - d \quad (11)$$
$$I_x = I + d \quad (12)$$

These equations show that although $I$ was defined originally as the average of the currents $I_1$ and $I_2$ it is, because of the nature of the circuit, also equal to the average of the currents $I_3$ and $I_x$.

Referring now to Fig. 10 in which the various currents and resistors are designated by the prefered symbols, and applying Kirchhoff's second law, an equation in terms of $E_1$ may be obtained from the mesh $R_1(R+r)(G-g)$ and also one from the mesh $R_1(G+g)(R-r)$. Writing the two equations and adding the results, the following are obtained:

$$E_1 = R_1(I+s) + (R+r)(I-d) + (G-g)(s-d) \quad (13)$$
$$E_1 = R_1(I+s) + (R-r)(I+d) + (G+g)(s+d) \quad (14)$$
$$2E_1 = (2R_1 + 2R)I + (2R_1 + 2G)s - (2r - 2g)d \quad (15)$$

Similar equations in terms of $E_2$ may be obtained from similar meshes as follows:

$$E_2 = R_2(I-s) + (R-r)(I+d) - (G-g)(s-d) \quad (16)$$
$$E_2 = R_2(I-s) + (R+r)(I-d) - (G+g)(s+d) \quad (17)$$
$$2E_2 = (2R_2 + 2R)I - (2R_2 + 2G)s - (2r + 2g)d \quad (18)$$

A third and necessary equation may be obtained from the mesh including no E. M. F.'s, namely:

$$0 = (R+r)(I-d) + (G-g)(s-d) - (R-r)(I+d) - (G+g)(s+d) \quad (19)$$

Simplifying:

$$0 = rI - gs - (R+G)d \quad (20)$$

Equations 15, 18, and 20 may be written in more convenient forms as follows:

$$\frac{E_1}{R_1 + R} = I + \frac{R_1 + G}{R_1 + R}s - \frac{r - g}{R_1 + R}d \quad (21)$$

$$\frac{E_2}{R_2 + R} = I - \frac{R_2 + G}{R_2 + R}s - \frac{r + g}{R_2 + R}d \quad (22)$$

$$0 = \frac{r}{R+G}I - \frac{g}{R+G}s - d \quad (23)$$

Solving Equations 21, 22 and 23 by determinates, the following are obtained:

$$I = \frac{\frac{E_1}{R_1 + R}\frac{R_2 + G}{R_2 + R} + \frac{E_2}{R_2 + R}\frac{R_1 + G}{R_1 + R} - \left(\frac{E_1}{R_1 + R}\frac{r + g}{R_2 + R} - \frac{E_2}{R_2 + R}\frac{r - g}{R_1 + R}\right)\frac{g}{R + G}}{\frac{R_2 + G}{R_2 + R} + \frac{R_1 + G}{R_1 + R} - \left(\frac{r + g}{R_2 + R} - \frac{r - g}{R_1 + R}\right)\frac{g}{R + G} - \left(\frac{R_1 + G}{R_1 + R}\frac{r + g}{R_2 + R} + \frac{R_2 + G}{R_2 + R}\frac{r - g}{R_1 + R}\right)\frac{r}{R + G}} \quad (24)$$

$$s = \frac{\frac{E_1}{R_1 + R} - \frac{E_2}{R_2 + R} - \left(\frac{E_1}{R_1 + R}\frac{r + g}{R_2 + R} - \frac{E_2}{R_2 + R}\frac{r - g}{R_1 + R}\right)\frac{r}{R + G}}{\frac{R_2 + G}{R_2 + R} + \frac{R_1 + G}{R_1 + R} - \left(\frac{r + g}{R_2 + R} - \frac{r - g}{R_1 + R}\right)\frac{g}{R + G} - \left(\frac{R_1 + G}{R_1 + R}\frac{r + g}{R_2 + R} + \frac{R_2 + G}{R_2 + R}\frac{r - g}{R_1 + R}\right)\frac{r}{R + G}} \quad (25)$$

$$d = \frac{\left(\frac{E_1}{R_1 + R}\frac{R_2 + G}{R_2 + R} + \frac{E_2}{R_2 + R}\frac{R_1 + G}{R_1 + R}\right)\frac{r}{R + G} - \left(\frac{E_1}{R_1 + R} - \frac{E_2}{R_2 + R}\right)\frac{g}{R + G}}{\frac{R_2 + G}{R_2 + R} + \frac{R_1 + G}{R_1 + R} - \left(\frac{r + g}{R_2 + R} - \frac{r - g}{R_1 + R}\right)\frac{g}{R + G} - \left(\frac{R_1 + G}{R_1 + R}\frac{r + g}{R_2 + R} + \frac{R_2 + G}{R_2 + R}\frac{r - g}{R_1 + R}\right)\frac{r}{R + G}} \quad (26)$$

From Equations 21–23 it will be seen that if $s$, the average downward current value through the two branches of the network including the detectors is zero; and if $d$, magnitude of the deviation of the two downward currents from their average, be zero, then from Equation 21, the two right-hand terms disappearing, there may be written:

$$I = \frac{E_1}{R_1 + R} \quad (27)$$

and from Equation 22, the two right-hand terms disappearing, there may be written:

$$I = \frac{E_2}{R_2 + R} \quad (28)$$

and from Equation 23, since the two right-hand terms disappear and since $I$ has a finite value as set forth by Equations 27 and 28, it is known that $r$ is zero. Because $R_3 = R + r$ and $R_x = R - r$, then $$R_3 = R_x \quad (29)$$

Equations 27–29 set forth the conditions of balance and Equations 24–26 represent the general solution of the network.

Considering now Equation 25, it will be seen that in the neighborhood of balance, $s$, the average of the current values in the two detector branches of the network, will be strongly dependent on the first two terms of the numerator and there will be relatively small dependence upon $r$, the deviation in the resistance values of $R_3$ and $R_x$ from their average values.

The foregoing conclusion may be verified by the following considerations.

The first two terms of the numerator of Equation 25 appear also in the parentheses of this numerator with the same relative signs. However, in the parentheses they are multiplied respectively by the small quantities $$\frac{r+g}{R_2+R}$$

and $$\frac{r-g}{r_1+R}$$

Hence the quantity $$\frac{r}{R+G}$$

is multiplied by a quantity in the parentheses which is relatively small and a change in $r$ will produce only a relatively small change in $s$.

In summary, the magnitude of $s$ will be strongly dependent on the following:

$$\frac{E_1}{R_1+R} - \frac{E_2}{R_2+R}$$

By applying similar reasoning to the numerator of Equation 26, it may be seen that the quantity in the first parenthesis is relatively large so that when $r$ is changed it will greatly affect the value of $d$. On the other hand, if a like change were to occur in $$\frac{E_1}{R_1+R}$$

or in $$\frac{E_2}{R_2+R}$$

there will be but a small change in the value of $d$ because the multiplying factor $$\frac{g}{R+G}$$

is of itself small and its value does not change because the value of $g$ depends upon the constants of the circuit, the deviation in the resistance values of the branches including the detectors from their average value.

The foregoing analysis makes it clear why the circuit arrangement as illustrated in Fig. 1 may be the preferred embodiment of the invention.

Referring to Figs. 1 and 10, it will be seen that the current $s$ flows from point 14 to point 15 and from point 16 to point 17. Hence, it will cause the sensitive element $G_2$ to deflect but will cause no deflection of $G_1$ with the pair of coils $G_1$ of equal strength for developing opposing torques on $G_1$. The current $d$ on the contrary, flows from point 14 to point 15, and as indicated by the minus sign (Fig. 10), flows from point 17 to point 16. Accordingly, with coils 10 and 11, Fig. 1, producing opposite torques of equal magnitude, galvanometer $G_2$ will not deflect in response to current $d$, but galvanometer or sensitive element $G_1$ will deflect. By adjusting $R_3$ until element $G_1$ shows zero deflection, the current $d$ is brought very near to zero. By adjusting $R_1$ (or $R_2$) until element $G_2$ shows zero deflection, the current $s$ is brought very near to zero. If each of these adjustments is made simultaneously, both of currents $d$ and $s$ are reduced to zero and the circuit is in balance. If the coils of either sensitive element do not produce equal torques with equal currents flowing therethrough, the condition of balance will not be affected but there will result interaction between the two balancing adjustments. Some interaction, however, can be tolerated in the operation of the system, the important thing being that final balance is not affected and hence, the accuracy of measurement is unaffected.

Now that the principles of the invention have been rather fully explained it will be understood that in the several embodiments of the invention more than two batteries, two dropping resistors and two impedances to be compared may be included. There may be a series of $n$ batteries, $n$ dropping resistors, and $n$ impedances to be compared or measured.

If all groups of three satisfy the equation $$\frac{E_1}{R_1+R_{x1}} = \frac{E_2}{R_2+R_{x2}} = \cdots = \frac{E_n}{R_n+R_{xn}}$$

any or all of the resistances $R_{x1}, R_{x2}, \ldots R_{xn}$ may be connected with galvanometers as in Fig. 1, and no currents flow if the resistances connected by the galvanometers are equal.

The foregoing will be readily understood with reference to Fig. 11 in which there has been illustrated any desired number of voltage sources, $E_1$, $E_2$, ... $E_n$ and corresponding resistors $R_1$, $R_2$, ..., $R_n$, and $R_{x1}$, $R_{x2}$, ..., $R_{xn}$. If $R_{x1}$ be adjustable, then the two sensitive elements $G_1$ and $G_2$ may be connected as by a multiple-position switch 55 across any selected one of the $R_x$ resistors. For example, if the detecting means be connected across $R_{x2}$ the primary balance is immediately achieved by varying $R_{x1}$ until the response of the detecting means is a minimum. The secondary balance is then achieved by adjustment of either $R_1$ or $R_2$. The value of $R_{x2}$ will then be known because equal to the calibrated adjustable resistor $R_{x1}$. The detecting means shown diagrammatically in Fig. 11 may be of any of the types previously described.

The arrangement of Fig. 11 also has a further useful application. If it be desired to bring to equality a plurality of resistors, i. e., each equal to a standard, the standard resistor may be connected as $R_{x1}$. The detecting means can first be connected to $R_{x2}$ and its resistance varied in manner well known by those skilled in the art to establish its equality with $R_{x1}$, i. e., primary balance is attained. The detecting means $G_1$, $G_2$, will then be connected to $R_{x3}$ and the foregoing procedure repeated. When the total number of resistors has been made equal to the standard $R_{x1}$ they will all have equal values.

It is not necessary in all cases to have two sensitive elements. A single galvanometer can be used with suitable switching means to connect it first between points 14 and 15 and then between points 16 and 17, the connections of the single galvanometer or detector in each branch being in accordance with the requirements already set forth. Moreover, balance can be achieved by utilizing but a single detecting means or galvanometer permanently connected across a pair of points 14, 15 or 16, 17. Assuming, for example, that in Fig. 9 there is provided only the sensitive element $G_1$ and that in place of $G_2$ there be substituted a switch for opening and closing the circuit between points 16 and 17, galvanometer $G_1$ will first be brought to balance by adjustment of $R_3$ with the switch closed to establish equal potential at points 16 and 17. The switch will then be opened and balance of galvanometer $G_1$ again attained by adjustment of $R_1$ or $R_2$. By repeating this process the system can soon be brought to final balance; i. e., independent of whether the switch be open or closed. Under such conditions $R_3$ will be equal to $R_x$.

Figure 12:
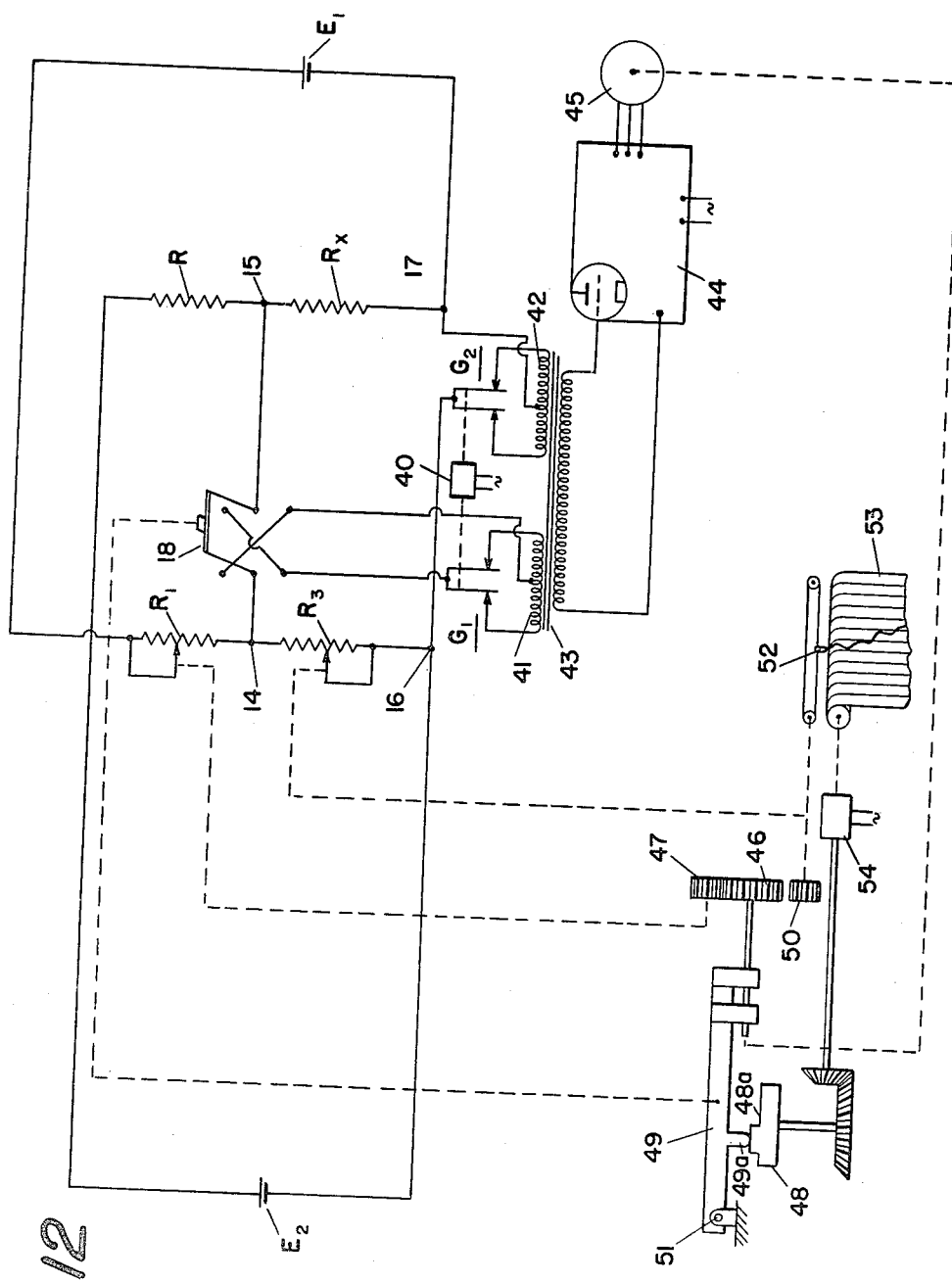
Fig. 12 illustrates a fully automatic system.

A fully automatic system has been illustrated in Fig. 12 in which corresponding parts have been given reference characters corresponding with those used in earlier described modifications. In Fig. 12 the sensitive elements $G_1$ and $G_2$ have been shown as including a pair of single-pole, double-throw vibrators driven by a coil 40 energized by a suitable source of alternating current. Double vibrator contacts have been illustrated in order that the respective primary windings 41 and 42 of the input transformer 43 will always be connected in circuit; that is to say, so that the respective ends of transformer windings 41 and 42 will never be simultaneously open-circuited. The relative connections of the ends of primary windings 41 and 42 with respect to the stationary contacts of the vibrators will be selected so that with the reversing switch in one position an unbalance voltage due to a primary unbalance of the network will be applied to a detector amplifier 44 and with the reversing switch in the other position the voltage applied to detecting amplifier 44 will be due to the secondary unbalance of the system.

It can be assumed that a primary balancing operation has been accomplished and that the reversing switch 18 has been moved to its illustrated upper position for secondary balance. The unbalance voltage applied by the primary winding of transformer 43 is amplified by detector amplifier 44 and applied to control the direction of rotation of a motor 45 which drives members 46 and 47 in the direction to adjust the value of resistor $R_1$ to reduce the voltage applied at the input of the detector amplifier 44. Since the detector amplifier 44 and the motor 45 may be generally of the type shown in Williams Patent No. 2,113,164, the balancing operation can be achieved in a short time. Accordingly, after a second or two a timing disc 48 moves a relatively short circumferential crest from beneath the cam follower 49a for movement of lever 49 in a clockwise direction about pivot pin 51. Concurrently with movement of lever 49 downwardly, the reversing switch 18 is moved to its downward position to establish connections of the detector 44 to be responsive to primary unbalance. Thus, as motor 45 is energized in a direction to reduce primary unbalance as by adjustment of resistor $R_3$, a pen-index 52 may be simultaneously adjusted relative to a record chart 53 and a scale (not shown). Thus the record or chart 53 driven by a motor 54 will represent with great accuracy the resistance of $R_x$. $R_3$ will be adjusted at high speed to maintain it equal in value to $R_x$. This equality will be maintained even though some secondary unbalance appears and there will be approximate equality with substantial secondary unbalance. Since it is desirable periodically to check the system to be sure that there has not been great departure in the secondary unbalance, the timing disc or cam 48 may be arranged so that the depression 48a may extend substantially about the circumference thereof, leaving but a fairly narrow ridge or crest for a short time interval for adjustment of resistor $R_1$ to establish secondary balance.

As already mentioned, other forms of detecting means and automatically operable balancing systems may be utilized. The one shown in Fig. 12 is to be taken as suggestive and not as limiting the scope of the invention.

Mention has earlier been made of the application of the invention to the measurement of impedances other than the purely resistive, and including any combinations of resistance, capacitance and inductance. Such a measuring network has been diagrammatically shown in Fig. 13, the operation of which will be apparent from the explanations already set forth. In brief, it will be seen that in the branch including the source $E_1$ there is connected a variable resistor $R_1$ and a variable inductor $L_1$ and the primary winding of a variable mutual-inductor M. In the branch including the source $E_2$ there is included in series with variable resistor $R_2$ a variable inductor $L_2$. The unknown impedance Z has been diagrammatically shown to comprise a resistor, a capacitor and an inductor.

Primary balance is achieved by adjustment of resistor $R_3$ and of the variable mutual-inductor M. Resistor $R_3$ provides the balance for the resistive component and the mutual-inductor M provides the balance for the reactive component resulting from the inductance and/or capacitance of impedance Z.

Figure 13:
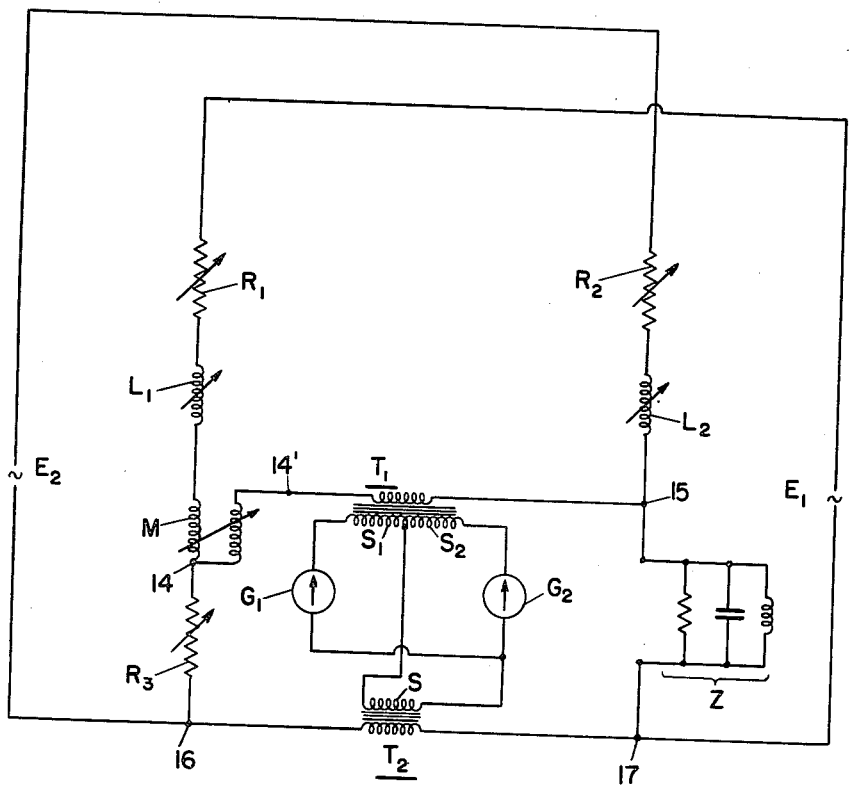
Fig. 13 illustrates a modification for measuring complex impedances.

It will be observed that the system of Fig. 13 includes current transformers $T_1$ and $T_2$ whose primary windings are respectively connected between points 14' and 15 and between points 16 and 17. The secondary winding S of transformer $T_2$ is connected in the circuit with such a polarity with reference to the secondary windings $S_1$ and $S_2$ of transformer $T_1$, that, under conditions where $S_1$ and $S$ cause additive currents in $G_1$, they will cause opposing currents in $G_2$. Secondary balance is achieved by adjustment of resistor $R_1$ and of inductor $L_1$. With both primary balance and secondary balance achieved, the potentials due to the resistive components will be equal at the points 14, 15, 16, 17. The potentials at the points 15 and 17 due to the reactive component of the unknown impedance Z will be balanced out by the reactive voltage-component produced in the secondary winding of the mutual-inductor M and introduced between the points 14, 14'. Galvanometers G₁ and G₂ are of the vibration type well-known to those skilled in the art.

While preferred embodiments of the invention have been illustrated, it is to be understood that features described in connection with one embodiment can be used in any of the embodiments of the invention and that further modifications can be made, all within the scope of the appended claims.

What is claimed is:

1. A measuring system comprising two voltage sources, at least one of which is adjustable, a reference resistor and a second resistor whose resistance value is to be measured, said sources and said resistors being connected in series-circuit relation with each other, two sensitive elements, one of which is connected between an end of said reference resistor and an end of said second resistor, and the other of which is connected to the remaining ends of said resistors, and means for selectively combining the response of said elements in aiding and opposing relationship.

2. A measuring system comprising two voltage sources, at least one of which is variable, a reference resistor and a second resistor whose resistance value is to be measured, said sources and said resistors being connected in a series-circuit with said sources in voltage-aiding relationship, a first sensitive element connected to the reference resistor on the side thereof adjacent one voltage source and connected to the side of said second resistor adjacent the other voltage source, a second sensitive element connected to the remaining sides of said resistors, means for adjusting said one voltage source until the current through said reference resistor bears a predetermined relation with respect to the current through said second resistor, and means for adjusting said reference resistor until it bears the same relation in value to said second resistor as said current through said second resistor bears to the current through said reference resistor.

3. A measuring system comprising two voltage sources, a reference resistor and a second resistor whose resistance value is to be measured, a series-circuit including said sources and said resistors, two sensitive elements, connections for connecting one element between a first end of said reference resistor and the end of said second resistor having the same relative polarity as said first end of said reference resistor, connections for connecting said other element to the remaining ends of said resistors, and means for adjusting the potential distribution of said series-circuit to develop potentials at the respective ends of one of said resistors having an average value equal to the average value of the potentials developed at the respective ends of said other resistor.

4. The combination set forth in claim 3 in which means are provided for adjusting said reference resistor until the potential difference between the respective ends thereof is equal to the potential difference between the respective ends of said second resistor.

5. A measuring system comprising at least two voltage sources, at least one reference resistor and at least one resistor whose resistance value is to be measured, a series-circuit including all of said sources and all of said resistors, at least two sensitive elements, connections for connecting one element between a first end of a reference resistor and the end of any other resistor whose resistance is to be measured having the same relative polarity as said first end of said reference resistor, connections for connecting said other element to the remaining ends of said last-mentioned resistors, said voltage sources having values such that the average of the potentials at the two ends of the reference resistor is equal to the average of the potentials at the two ends of the resistor to be measured, and means for relatively adjusting the resistors interconnected by said sensitive elements until the potential difference between the respective ends of one resistor is equal to the potential difference across the other resistor.

6. The combination set forth in claim 5 in which switching means are provided for connection of said sensitive elements between any selected reference resistor and any other of the resistors whose resistance value is to be determined.

7. A measuring system comprising two voltage sources, a reference resistor and a second resistor whose resistance value is to be measured, a series-circuit including said sources and said resistors, two sensitive elements each having two coils, connections for connecting one coil of each said element between a first end of said reference resistor and the end of said second resistor having the same relative polarity as said first end of said reference resistor, connections for connecting said other coil of each element to the remaining ends of said resistors, the current path through the coils of one said element being such that when current flows through them in the same direction, current flows through said coils of the other element in opposite directions, and means for adjusting the potential distribution of said series-circuit to develop potentials at the respective ends of one of said resistors having an average value equal to the average value of the potentials developed at the respective ends of said other resistor.

8. The combination set forth in claim 7 in which means are provided for adjusting said reference resistor until the potential difference between the respective ends thereof is equal to the potential difference between the respective ends of said second resistor.

9. A measuring system comprising two voltage sources, a reference impedance and a second impedance whose value is to be measured, said voltage sources and said impedances being alternately arranged and connected in series-circuit relation with each other, detecting means including two sensitive elements and two circuit branches, one of which extends between an end of said reference impedance and an end of said second impedance and the other of which extends between the remaining ends of said impedances, and means for reversing the current-flow in one of said sensitive elements with respect to current-flow in the other of said sensitive elements.

10. A measuring system comprising two voltage sources, a reference impedance and a second impedance whose value is to be measured, said voltage sources and said impedances being alternately arranged and connected in series-circuit relation with each other, detecting means including at least one sensitive element and two circuit branches, one of which extends between an end of said reference impedance and an end of said second impedance and the other of which extends between the remaining ends of said impedances, and circuit changing means in at least one of said circuit branches for reversing the direction of current-flow therethrough.

11. A measuring system comprising two voltage sources, one of said voltage sources being adjustable, a reference impedance and a second impedance whose value is to measured, said voltage sources and said impedances being alternately arranged and connected in series-circuit relation with each other, detecting means including at least one sensitive element and two circuit branches, one of which extends between an end of said reference impedance and an end of said second impedance and the other of which extends between the remaining ends of said impedances, means for adjusting said one voltage source until the current through said reference impedance bears a predetermined relation with respect to the current through the said second impedance, and means for adjusting said reference impedance until it bears the same relation in resistance value to said second impedance as said current through said second impedance bears to the current through said reference impedance.

12. A measuring system comprising two current sources, at least one of which is adjustable, a reference resistor and a second resistor whose resistance value is to be measured, said sources of current and said resistors being connected in series with each other, two sensitive elements, one of which is connected between an end of said reference resistor and an end of said second resistor and the other of which is connected to the remaining ends of said resistors, means for combining the responses of said sensitive elements, means for varying said adjustable source until a predetermined relation of the currents through said resistors produces a predetermined response of said sensitive elements, means for reversing the connections to one of said elements, and means for adjusting said reference resistor to produce a second predetermined response of said elements, thereby to establish the same relation in resistance value of said reference resistor with respect to said second resistor as said current through said second resistor bears to the current through said reference resistor.

13. A measuring system comprising at least two voltage sources, at least one of which is variable, a reference resistor and a second resistor whose resistance value is to be measured, said sources and said resistors being connected in series with each other, two sensitive elements, connections for connecting one element between a first end of said reference resistor and the end of said second resistor having the same relative polarity as said first end of said reference resistor, connections for connecting said other element to the remaining ends of said resistors, and means providing for current-flow in one element reversed with respect to current-flow in the other element.

14. The combination set forth in claim 13 in which said variable source is adjusted until said elements have a minimum response, the current through said reference resistor then bearing a predetermined relation with respect to the current through said second resistor, and means for relatively adjusting the resistances of said resistors until said elements, with the current through one of them reversed, again have a minimum response, the resistance of said reference resistor then bearing the same relation in resistance value to said second resistor as said current through said second resistor bears to the current through said reference resistor.

References Cited in the file of this patent

UNITED STATES PATENTS

| Number | Name | Date |
|---|---|---|
| 2,448,461 | Postal | Aug. 31, 1948 |
| 2,572,626 | Kelly | Oct. 23, 1951 |
| 2,607,827 | Mennie | Aug. 19, 1952 |

OTHER REFERENCES

"The Comparison of Two Nearly Equal Electrical Resistances Using a Substitution Method With Two Current Sources," J. De Smedt and A. De Bock—Mededelingen Van De Koninklijke Vlaamse Academie Voor Wetenschappen, Letteren En Schone Kunsten Van Belgie, volume 12, No. 9 (1950).

"Methode Van De Overgrijpende Nevensluitingen Met Twee Stroombronnen," J. De Smedt—Mededeelingen Van De Koninklijke Vlaamsche Academie Voor Wetenschappen, Letteren En Schoone Kunsten Van Belgie, volume 3, No. 8 (1941).